United States Patent
Harris

(10) Patent No.: US 9,514,750 B1
(45) Date of Patent: Dec. 6, 2016

(54) VOICE CALL CONTENT SUPRESSION

(71) Applicant: Andrew Mitchell Harris, Athens, GA (US)

(72) Inventor: Andrew Mitchell Harris, Athens, GA (US)

( * ) Notice: Subject to any disclaimer, the term of this patent is extended or adjusted under 35 U.S.C. 154(b) by 559 days.

(21) Appl. No.: 13/844,674

(22) Filed: Mar. 15, 2013

(51) Int. Cl.
　　*G10L 15/26* (2006.01)
　　*G10L 15/18* (2013.01)

(52) U.S. Cl.
　　CPC .......... *G10L 15/26* (2013.01); *G10L 15/1822* (2013.01)

(58) Field of Classification Search
　　CPC ....................................... G10L 15/26
　　USPC ....................................... 704/270
　　See application file for complete search history.

(56) References Cited

U.S. PATENT DOCUMENTS

| | | | |
|---|---|---|---|
| 7,437,290 B2* | 10/2008 | Danieli | 704/251 |
| 2004/0064317 A1* | 4/2004 | Othmer et al. | 704/260 |
| 2005/0086206 A1* | 4/2005 | Balasubramanian et al. | 707/3 |
| 2006/0095262 A1* | 5/2006 | Danieli | 704/251 |
| 2007/0244700 A1* | 10/2007 | Kahn et al. | 704/235 |
| 2007/0294077 A1* | 12/2007 | Narayanan et al. | 704/2 |
| 2008/0037719 A1* | 2/2008 | Doren | 379/85 |
| 2008/0081697 A1* | 4/2008 | Domville et al. | 463/42 |
| 2008/0184284 A1* | 7/2008 | O'Hern | 725/28 |
| 2008/0221882 A1* | 9/2008 | Bundock et al. | 704/235 |
| 2008/0294439 A1* | 11/2008 | Kirby | 704/251 |
| 2009/0055189 A1* | 2/2009 | Stuart et al. | 704/270 |
| 2009/0089057 A1* | 4/2009 | Batot et al. | 704/251 |
| 2009/0307779 A1* | 12/2009 | Doren | 726/26 |
| 2010/0114791 A1* | 5/2010 | Gold et al. | 705/347 |
| 2010/0324894 A1* | 12/2010 | Potkonjak | 704/235 |
| 2010/0333158 A1* | 12/2010 | McCormack et al. | 725/109 |
| 2012/0201362 A1* | 8/2012 | Crossan et al. | 379/88.01 |
| 2012/0203545 A1* | 8/2012 | Shaw | 704/9 |
| 2013/0018656 A1* | 1/2013 | White et al. | 704/235 |
| 2013/0090917 A1* | 4/2013 | Chalmers et al. | 704/9 |
| 2013/0151251 A1* | 6/2013 | Herz et al. | 704/235 |
| 2013/0317808 A1* | 11/2013 | Kruel et al. | 704/9 |
| 2015/0057994 A1* | 2/2015 | Fang et al. | 704/4 |

* cited by examiner

*Primary Examiner* — Douglas Godbold
(74) *Attorney, Agent, or Firm* — Mitch Harris, Atty at Law, LLC; Andrew M. Harris

(57) ABSTRACT

A method and system manage voice communications provided over a network and include establishing a conversation between an originating station and a terminal station where audible communications are permitted between stations. At least a portion of the conversation is allowed to proceed. The audio data content of the conversation is processed to recognize verbal content and the recognized verbal content is matched with phrases to detect content containing a particular phrase or topic that is disallowed for the conversation. In response to detecting the particular phrase or topic that is disallowed for the conversation, the audio data content is filtered to remove the particular phrase or topic from the audio data content.

20 Claims, 4 Drawing Sheets

VOICE CALL CONTENT SUPRESSION

FIELD OF THE INVENTION

The present invention relates generally to telecommunication systems and telephony devices such as mobile telephones, and more particularly to telecommunications systems and telephony devices that can selectively audit and block content.

DESCRIPTION OF THE RELATED ART

Call blocking technology exists that can selectively block calls from particular stations, so that telephone subscribers are not harassed by other persons who are known to be likely to make undesirable calls to their station.

However, such techniques are ineffective when the caller uses another originating station, or when the receiver of the call wants to allow the call to come through to allow for handling of matters that are appropriate between the caller and the receiving party. There is always a chance, however, that the conversation may become undesirable, requiring the receiving party to try to control the situation, or terminate the call, which may not be simple.

Therefore, it would be desirable to provide improved technology for handling calls that might contain undesirable content.

SUMMARY OF THE INVENTION

The above objectives and others are provided in a method, computer system, telephone network and computer program products that selectively filter content of telephone conversations. The method is generally a method of operation of the computer system and telephone network as directed by the computer program products.

The method manages voice communications provided over a network and includes establishing a conversation between an originating station and a terminal station where audible communications are permitted between stations. At least a portion of the conversation is allowed to proceed. The audio data content of the conversation is processed to recognize verbal content and the recognized verbal content is matched with phrases to detect content containing a particular phrase or topic that is disallowed for the conversation. In response to detecting the particular phrase or topic that is disallowed for the conversation, the audio data content is filtered to remove the particular phrase or topic from the audio data content.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention encompasses techniques for removing undesirable content from telephone conversations that may be performed at the originating device, within the network, or at the terminal device. The network may be a traditional telephone network, such as wireless telephony, or may be data-based connection such as those provided by programs connected via the Internet and executing on general-purpose computer systems, tablets or smart phones. A conversation is established, and content is processed to detect words or phrases that are determined to be undesirable in the conversation. The processing may be triggered by an identifier of the originating station or the terminal station, or may be for example, processing applied at an originating device under the direction of the user, to prevent the user from saying something undesirable. In other implementations, the processing may be applied to the originator's portion of the conversation, either in the network, or at the terminal station, to remove content that is undesirable, which may be triggered by recognizing the originating station identification, as when a person expects to receive undesirable calls from a particular person, or when a court order specifies filtering content of calls from a particular person or originating station, which might be applied in general to that station.

Since processing power of mobile devices is steadily increasing, as well as the computational power of computing resources in general, which can be applied within the network, adding conversational filtering can be a reasonable computational burden, especially when applied selectively, or when using the terminal station's computing resources. Examples of applications of the technology are the terminal device-determined filtering as mentioned above, where a receiver of calls may specify particular originating stations for filtering content, or where the receiver of calls may specify only words/phrases or topics that should be blocked. For example, a parent could set up a child's mobile device to block words or conversations that are unsuitable for children or unsuitable in general. Other user's may want to block obscene calls, or even sales calls or content of political ads when such content is detected. When undesirable topics are detected, the content can be blanked for a predetermined time and a warning sent to the originating station that the content was not presented. Particular topics or words/phrases could be identified to the originator. In other contexts, a person may want to prevent themselves from using certain words when in communication with, for example, a child, professional associate, or customer. For example, proprietary information could be detected and blocked.

Figure 1:
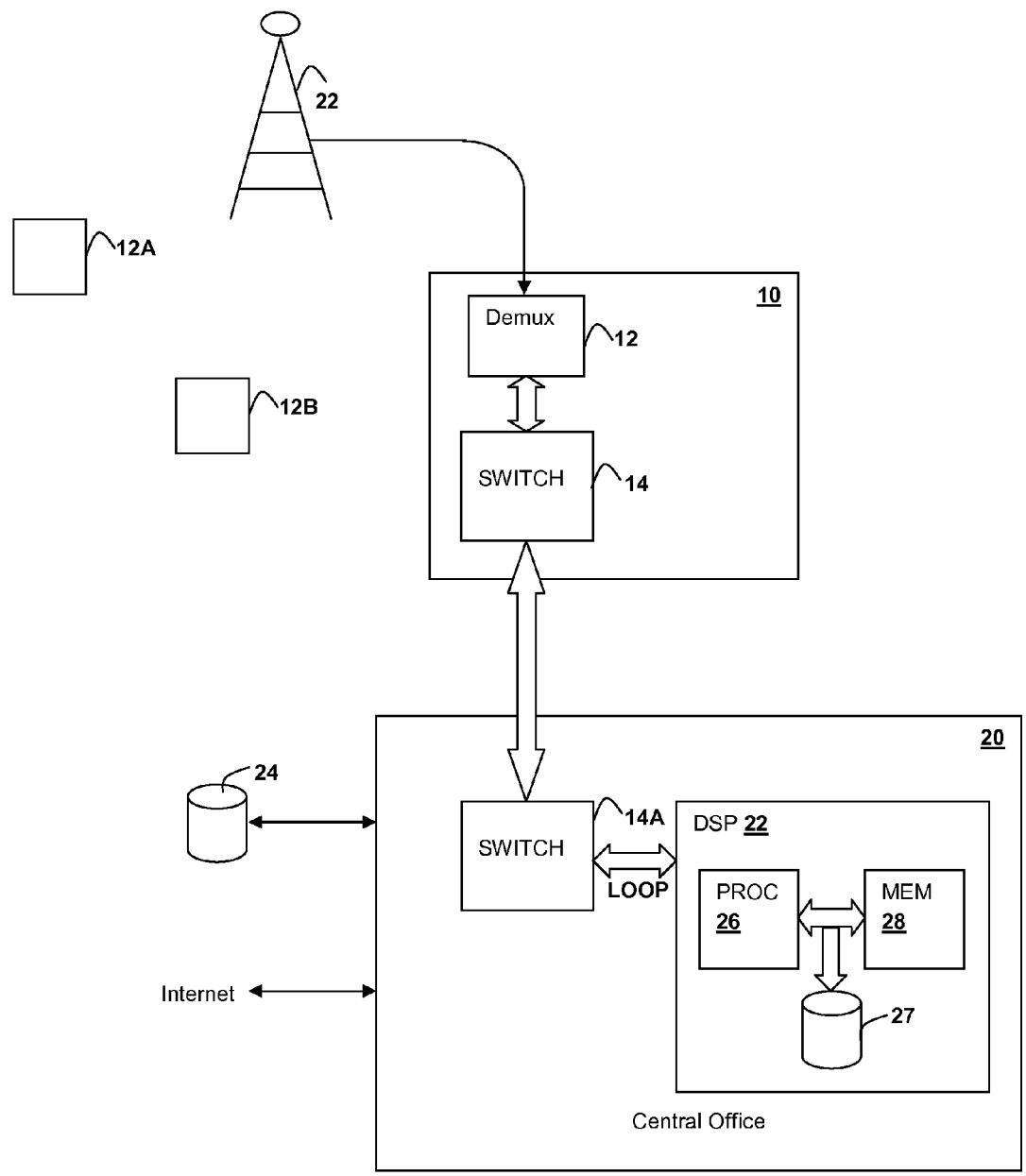
FIG. 1 is a pictorial drawing of a mobile communications system in which techniques in accordance with embodiments of the invention are practiced.

FIG. 1 shows a system including a mobile telephone 10 in accordance with an embodiment of the invention, in communication with a mobile telephone tower 22 and associated ground system 10 including a demux 12 and switch 14 that is coupled to one or more server systems 20 executing program code implementing portions or all of methods in accordance with various embodiments of the present invention. Server systems 20 are coupled to one or more databases 24 that provide storage of per-user configuration information and other information such as logs of information communicated from mobile telephone 12A and other mobile telephones 10B. Server systems 20 are also coupled to other networks, such as the Internet, not only for providing network access to mobile telephones 10, 10A, but also to provide particular communications used in implementing various methods of the present invention, as will be described in further detail below. A switch 14A illustrates connections between devices on the network, and a subscriber loop LOOP can be connected to a digital signal processor (DSP) 22 containing a processor 26, a memory 28 and a storage 27 for providing execution of a computer-program product forming a computer-readable storage device or media that is non-transitory, in that the computer program product may be stored on various media. However, when a portion of the program is executed, the portion is stored for at least the period during which the program is executed by processor 26, within memory 28. The computer program product contains program instructions for performing the detection and filtering operations described herein with respect to conversations occurring on the network between stations 12A,12B. However, as mentioned above, filtering can also be performed within one or both of stations 12A,12B.

Figure 2A:
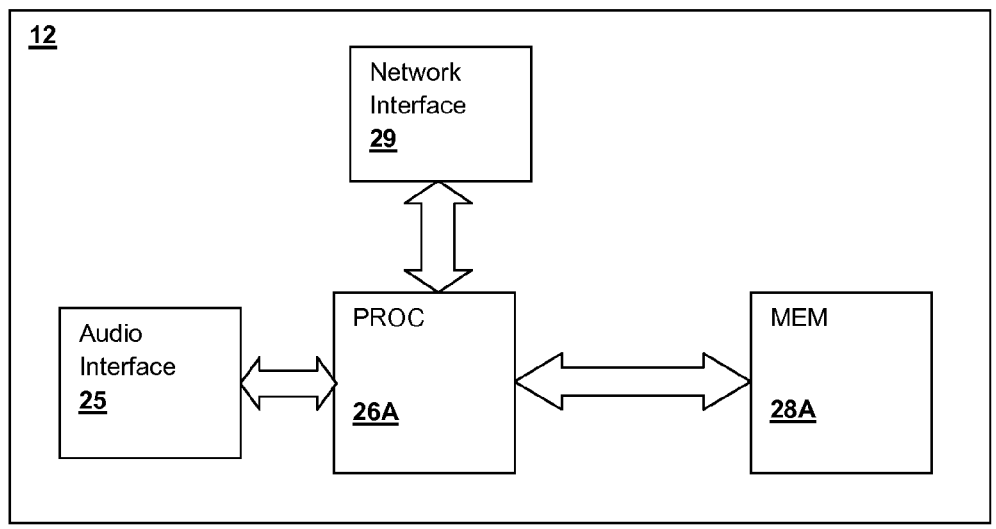
FIG. 2A is a block diagram of circuits within a device in accordance with an embodiment of the invention.

FIG. 2A shows a station 12 (originating or receiving) in which the techniques disclosed herein can be practiced, for example internals of mobile devices 12A, 12B of FIG. 1. An audio interface 25 couples a processor 26A to a speaker or other transducer for rendering distant conversation to the listener, and near conversation for conveyance over a network interface 29 to the network and ultimately to other station(s) participating in the conversation. A memory 28A is coupled to processor 26A for storing program instructions for execution by processor 26A forming a computer-readable storage device or media that is non-transitory, in that the computer program product may be stored on various media, but when a portion of the program is executed, the portion is stored for at least the period during which the program is executed by processor 26A, within memory 28A.

Figure 2B:
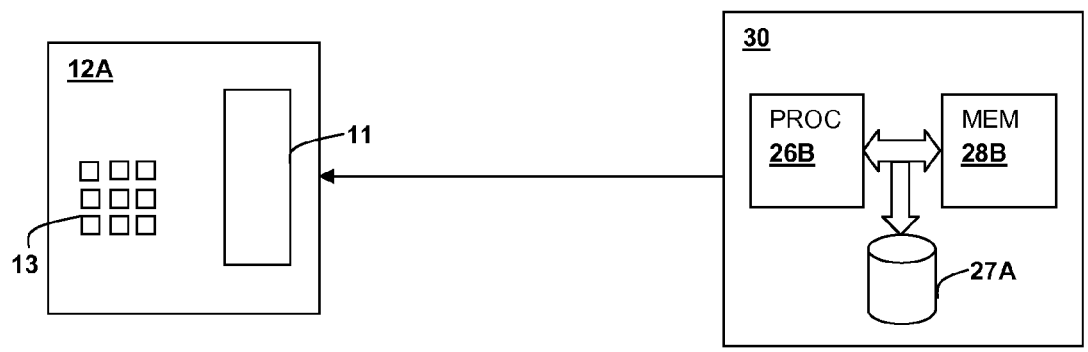
FIG. 2B is a block diagram of a system in accordance with an embodiment of the invention.

FIG. 2B shows another type of station, a traditional or digital desktop telephone 12A with a keypad 13 and a handset 11, coupled to a processing system 30, which may be local or remote, such as within a network, and containing a processor 26B, memory 28B and storage 27A, such as a storage within the network containing identifications of stations noted for detection and filtering of conversations, in general, or with respect to connections to other particular stations. The processing, as mentioned above, can also be performed partially, or completely within desktop telephone 12A which may contain the same processing elements as contained within the station 12 of FIG. 2A.

Figure 3:
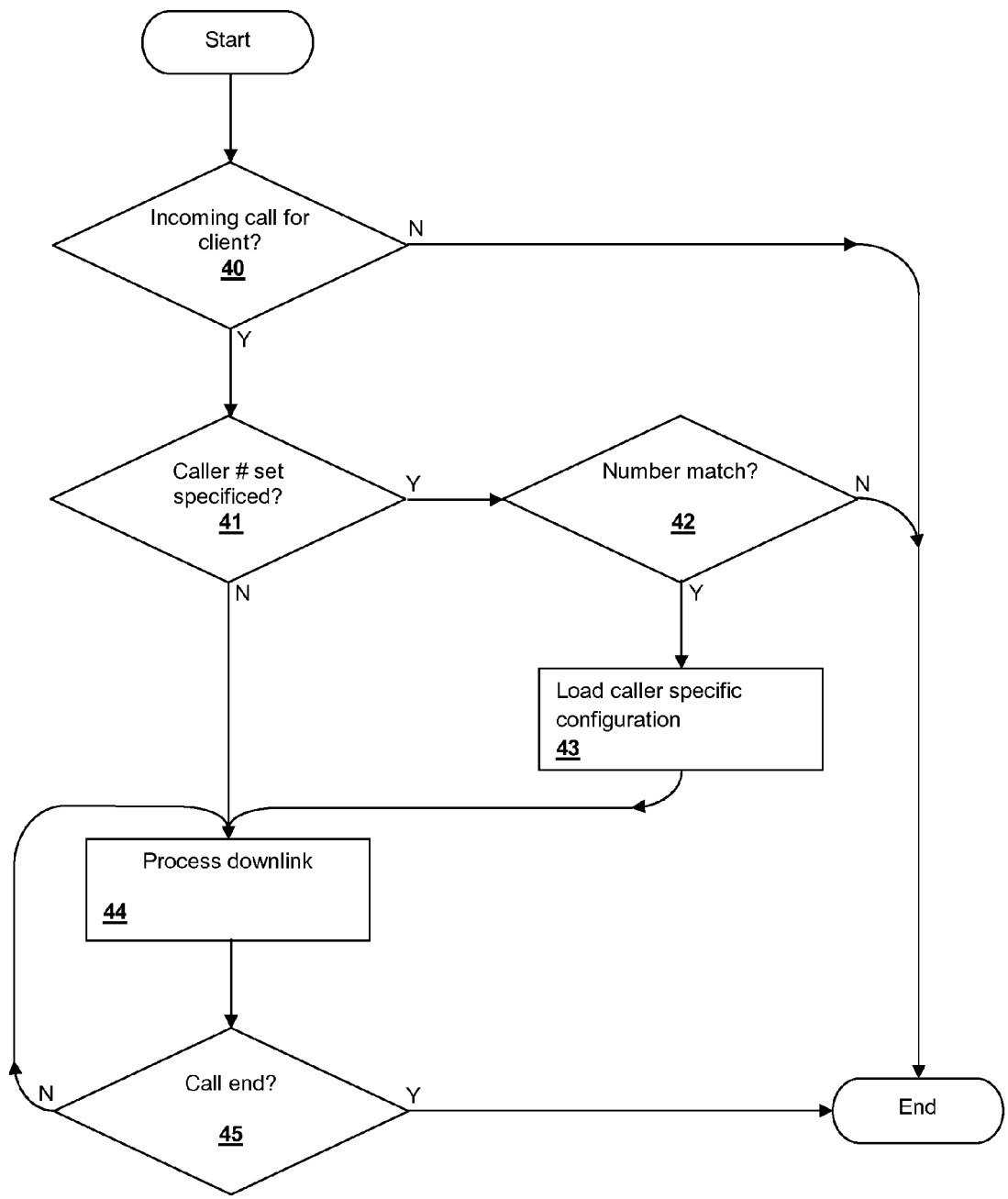
FIG. 3 is a flowchart depicting a method in accordance with an embodiment of the invention.

Referring now to FIG. 3, a method according to an embodiment of the invention is shown in a flowchart. When an incoming call for a client is received (decision 40), and optionally if the a caller set number is specified (decision 41) and if the number matches a number in a database (decision 42), then caller-specific information is loaded (step 43). The downlink audio, or alternatively uplink audio, is processed (step 44) to remove undesirable content and processing (step 44) is repeated until the call ends (decision 45).

Figure 4:
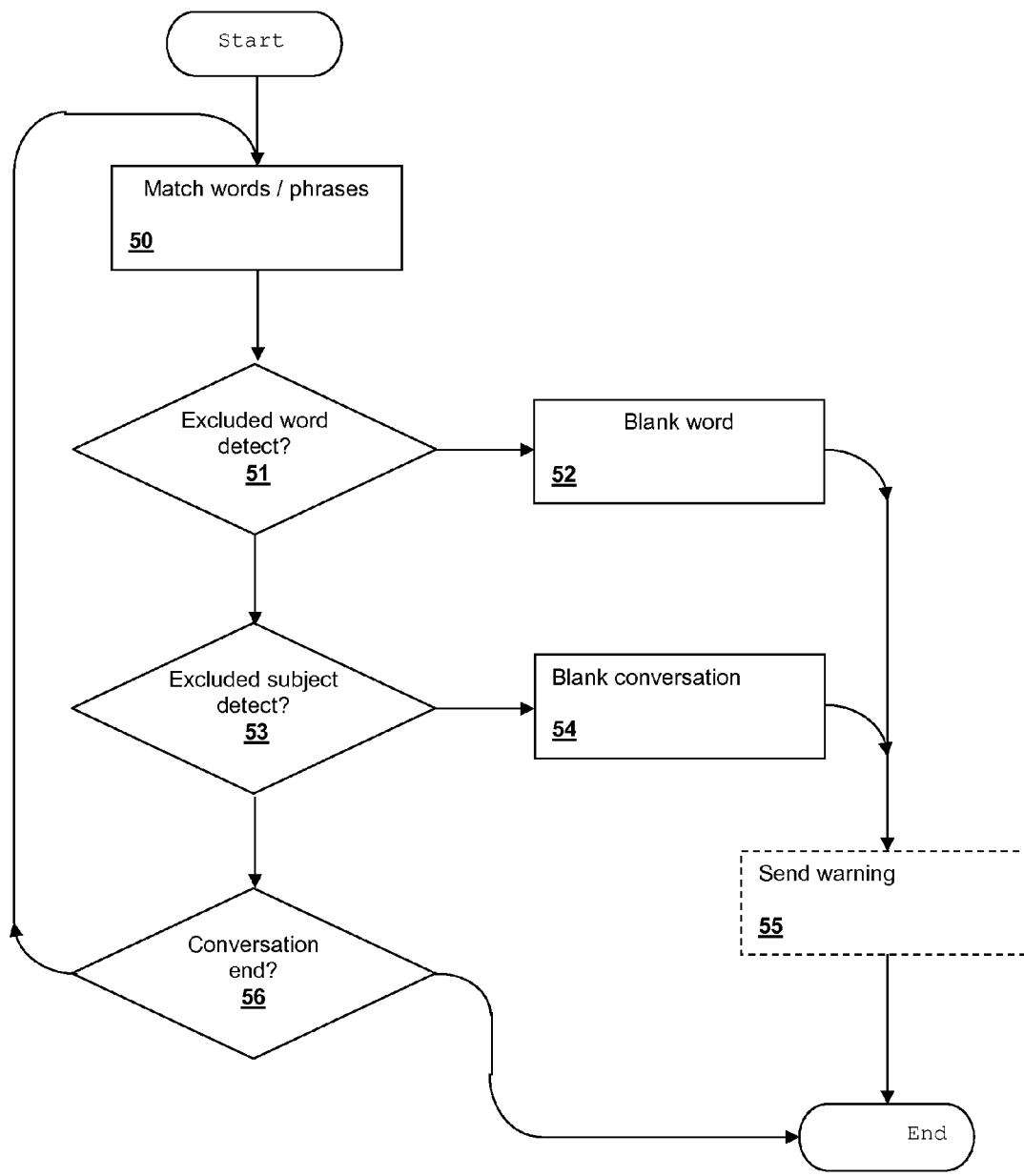
FIG. 4 is a flowchart depicting another method in accordance with an embodiment of the invention.

Referring now to FIG. 4, another method according to an embodiment of the invention is shown in a flowchart. Words or phrases detected in the conversation are matched (step 50) and if an excluded word is detected (decision 51) then the word is blanked (step 52). If an excluded subject (topic) is detected (step 53) then the conversation is blanked (step 54), optionally for a predetermined time period after no undesirable content is detected. A warning is optionally sent (step 55) after step 52 and/or step 54. Until the conversation ends (decision 56) the process of steps 50-55 is repeated.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of managing voice communications provided over a network, the method comprising:
    establishing a voice conversation between an originating station and a terminal station, wherein audible communications are permitted between the originating station and the terminal station;
    permitting at least a portion of the conversation to proceed;
    processing audio data content of the conversation to detect words and phrases in the voice conversation;
    responsive to the processing of the audio data content, first matching the detected words and phrases with stored words and phrases to determine that one or more of the detected words and phrases correspond to a current topic of conversation;
    second matching the current topic of the conversation with a set of excluded topics to determine if the current topic is an excluded topic;
    responsive to matching the current topic with an excluded topic, first blanking a first portion of the audio data corresponding to the one or more of the detected words and phrases that correspond to the current topic of conversation; and
    second blanking a second portion of the audio data corresponding to a predetermined time interval after the one or more of the detected words and phrases that correspond to a current topic of conversation.

2. The method of claim 1, further comprising presenting the first portion and the second portion of the audio data to the originating station or a terminal station other than the station that generated the content containing the particular phrase or topic that is disallowed for the conversation.

3. The method of claim 2, wherein the method further comprises:
    determining, from stored configuration information, whether or not one of the originating station or the terminal station is designated as a station for which conversation auditing has been directed; and
    responsive to determining that the originating station or the terminal station is designated as a station for which conversation auditing has been directed, performing the processing of the audio data content.

4. The method of claim 2, wherein the processing audio data content is performed at the station that originated the content containing the excluded topic, and wherein the second blanking is performed to prevent the station that originated the content containing the excluded topic from sending content for the predetermined time.

5. The method of claim 1, wherein the processing audio data content is performed at a station that receives the content containing the excluded topic, and wherein the first blanking is performed to prevent the station that received the content containing the excluded topic from reproducing the content that is blanked during the predetermined period.

6. The method of claim 1, wherein the processing audio data content and first matching are performed within a network coupling the originating station and the terminal station.

7. The method of claim 1, wherein the second blanking blanks the audio data content for the predetermined time after the first matching determines that the current topic has changed.

8. The method of claim 1, further comprising, responsive to detecting the excluded topic, sending a notification to the station that generated the content containing the excluded topic.

9. The method of claim 8, wherein the notification is a warning that a topic of the conversation has been detected as inappropriate.

10. The method of claim 8, wherein the notification is a notification that a portion of the conversation has been removed.

11. A system for method of managing voice communications provided over a network, the system comprising:
- at least one processor for executing program instructions;
- at least one memory coupled to the at least one processor for storing the program instructions;
- program instructions executed by the at least one processor during a voice conversation between an originating station coupled to the system and a terminal station coupled to the system, that process audio data content of the voice conversation to detect words and phrases in the voice conversation;
- program instructions executed by the at least one processor during the voice conversation that, responsive to the processing of the audio data content, first match the detected words and phrases with stored words and phrases to determine that one or more of the detected words and phrases correspond to a current topic of conversation
- program instructions executed by the at least one processor during the voice conversation that second match the current topic of conversation with a set of excluded topics to determine if the current topic of conversation is an excluded topic;
- program instructions executed by the at least one processor during the voice conversation that, responsive to determining that the current topic of conversation is an excluded topic, first blanking a first portion of the audio data content corresponding to the one or more of the detected words and phrases that correspond to the current topic of conversation; and
- program instructions executed by the at least one processor during the voice conversation that second blank a second portion of the audio data content corresponding to a predetermined time interval after the one or more of the detected words and phrases that correspond to the current topic of conversation.

12. The system of claim 11, wherein the program instructions that process the audio data content are executed by a processor of a station that originated the content containing the excluded topic, and wherein the program instructions that blank the second portion of the audio data are executed to prevent the station that originated the content containing the excluded topic from sending content for the predetermined time.

13. The system of claim 11, wherein the program instructions that process audio data content are executed at a station that receives the content containing the excluded topic, and wherein the program instructions that blank the first portion of the audio data content are executed to prevent the station that received the content containing the excluded topic from reproducing the content that is blanked during the predetermined period.

14. The system of claim 11, wherein the program instructions that process audio data content and first match the detected words and phrases with stored words and phrases are executed within a system coupling the originating station and the terminal station.

15. The system of claim 11, further comprising program instructions executed by the at least one processor during the voice conversation that, responsive to the program instructions for detecting having detected the excluded topic, send a notification to the station that generated the content containing the excluded topic.

16. A computer program product, comprising a computer readable memory storing program instructions for execution by a processor, the program instructions comprising program instructions for:
- program instructions executed by the at least one processor during a voice conversation between an originating station coupled to the system and a terminal station coupled to the system, that process audio data content of the voice conversation to detect words and phrases in the voice conversation;
- program instructions executed by the at least one processor during the voice conversation that, responsive to the processing of the audio data content, first match the detected words and phrases with stored words and phrases to determine that one or more of the detected words and phrases correspond to a current topic of conversation;
- program instructions executed by the at least one processor during the voice conversation that second match the current topic of conversation with a set of excluded topics to determine if the current topic of conversation is an excluded topic;
- program instructions executed by the at least one processor during the voice conversation that, responsive to determining that the current topic of conversation is an excluded topic, first blanking a first portion of the audio data content corresponding to the one or more of the detected words and phrases that correspond to the current topic of conversation; and
- program instructions executed by the at least one processor during the voice conversation that second blank a second portion of the audio data content corresponding to a predetermined time interval after the one or more of the detected words and phrases that correspond to the current topic of conversation.

17. The computer program product of claim 16, wherein the program instructions are program instructions of a station that originated the content containing the excluded topic, and wherein the program instructions that second blank the second portion of the audio data content are executed to prevent the station that originated the content containing the excluded topic from sending content for the predetermined time.

18. The computer program product of claim 16, wherein the program instructions are program instructions of a station that receives the content containing the excluded topic, and wherein the program instructions that first blank the first portion of the audio data content are executed to prevent the station that received the content containing the excluded topic from reproducing the content that is blanked during the predetermined period.

19. The computer program product of claim 16, wherein the program instructions that process audio data content and first match the detected words and phrases with stored words and phrases are program instructions of a system coupling the originating station and the terminal station.

20. The computer program product of claim 16, wherein the program instructions further comprise program instructions for, responsive to detecting the excluded topic, sending a notification to the station that generated the content containing the excluded topic.

\* \* \* \* \*